United States Patent [19]
Bowers

[11] 3,884,316
[45] May 20, 1975

[54] MOTORCYCLE TRANSMISSION

[75] Inventor: Michael R. Bowers, Westminster, Calif.

[73] Assignee: Yamaha International Corporation, Buena Park, Calif.

[22] Filed: Mar. 29, 1973

[21] Appl. No.: 345,905

[52] U.S. Cl. .................... 180/33 B; 74/230.17 A; 74/230.17 M; 74/230.17 E
[51] Int. Cl. ................. B62d 61/02; F16n 55/52
[58] Field of Search .................. 180/33 B, 33 R; 74/230.17 A, 230.17 E, 230.17 M, 567, 569

[56] References Cited
UNITED STATES PATENTS

| 2,173,661 | 9/1939 | Perrine | 74/230.17 M |
| 2,254,177 | 8/1941 | Getchell | 74/230.17 M |
| 2,378,549 | 6/1945 | Gruenhagen | 74/230.17 E |
| 2,556,512 | 6/1951 | Ammon | 74/230.17 M |
| 3,144,860 | 8/1964 | Harley | 180/33 R |
| 3,266,330 | 8/1966 | Galleher | 74/230.17 E |
| 3,605,510 | 9/1971 | Laughlin | 74/230.17 E |
| 3,625,079 | 12/1971 | Hoff | 180/33 B |
| 3,665,781 | 5/1972 | Kawamura | 74/230.17 E |

FOREIGN PATENTS OR APPLICATIONS

| 1,338,265 | 8/1963 | France | 74/230.17 A |

Primary Examiner—David Schonberg
Assistant Examiner—John P. Silverstrim
Attorney, Agent, or Firm—Lindenberg, Freilich, Wasserman, Rosen & Fernandez

[57] ABSTRACT

A motorcycle transmission of a variable speed belt type which utilizes pulley sheaves which vary in separation according to the force of centrifugal weights on a cam that is fixed to a sheave, wherein the cam face angle has a knee, or sharp bend, in it. The cam has a low face angle below the knee, so that the transmission remains at a low speed ratio while the engine accelerates to a high speed. The cam angle rapidly changes to a high face angle above the knee, so that the transmission rapidly increases in speed ratio after the engine reaches a near maximum speed, thereby effectively applying a high horsepower even at lower speeds to obtain maximum acceleration.

1 Claim, 6 Drawing Figures

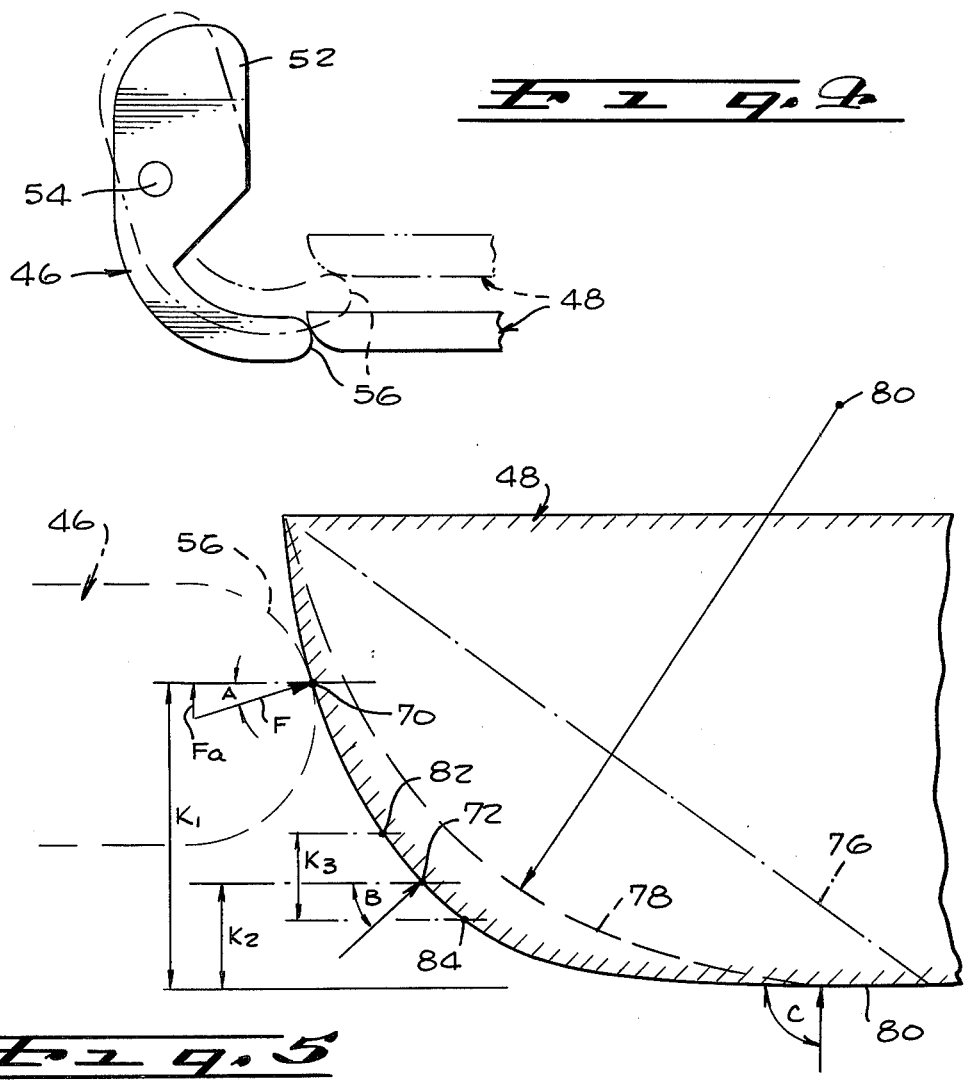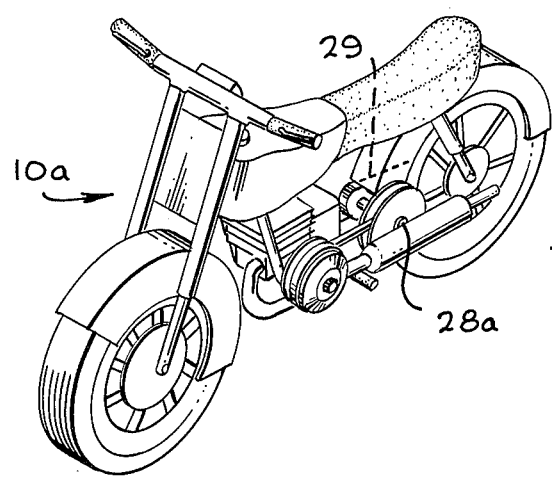

MOTORCYCLE TRANSMISSION

BACKGROUND OF THE INVENTION

This invention relates to motorcycles, and more particularly to an improvement in a motorcycle transmission.

One type of variable speed transmission includes a belt extending about two pulley assemblies, each pulley assembly including a pair of cone-shaped sheaves that can move together and apart to cause the belt to ride down towards the axis or up towards the periphery of the pulley faces. One pulley assembly can be mounted on the crankshaft of a motorcycle engine while the other pulley can be mounted on the rear wheel, to transmit power at a variable speed ratio. The moveable pulley member on the crankshaft can be moved by centrifugal weights, so that the separation of the pulley members decreases as the engine speed increases. The transmission therefore increases in speed ratio as the engine speed increases; that is, the ratio of the output or wheel speed to the engine speed increases. The moveable pulley on the shaft of the rear wheel can be moved by a torque-sensing cam arrangement which increases the speed ratio as the torque, or load applied to the rear wheel, decreases.

The foregoing type of transmission can be used in a variety of vehicles including those which normally have a high weight and traction for a given engine size, as is usually the case in snowmobiles. A transmission designed for a vehicle of high weight and traction can be employed in a vehicle with low weight and traction for a given engine size, such as a motorcycle. However, if account is not taken of the lower weight and traction of a motorcycle, then it is possible that optimum transmission characteristics will not be attained in the motorcycle application, even if the transmission was of optimum characteristics for the snowmobile. Of course, it is necessary to determine what the implications are of the lower ratio of power-to-weight and traction, and to find some way of altering the transmission to take advantage of the different type of load to be driven. Even a relatively small increase in transmission efficiency can be important where motorcycles are run in races, since the engine size may be limited or the increased weight of a larger engine offsets its power advantage.

SUMMARY OF THE INVENTION

In accordance with one embodiment of the present invention, a motorcycle is provided with a variable speed pulley transmission which enables a very high acceleration between low and high speeds for an engine of given size. The transmission includes a pair of pulley members rotatably mounted on the crankshaft, one being axially fixed and the other being moveable. A group of centrifugal weights pivotably mounted on the crankshaft bear against a cam that is fixed to the moveable pulley member. The centrifugal weights move the cam against the force of a spring, towards the fixed pulley member and thereby increase the effective pulley diameter at higher engine speeds. The cam is formed with a face that is curved with a knee, or sharp bend near one end. As a result, the weights bear against cam regions of low face angle until a high engine speed is reached, and then the weights bear against cam regions of rapidly increasing face angle. The low initial face angle minimizes the load on the engine to permit rapid acceleration of the engine so that it quickly attains a high speed at which it can deliver a high horsepower. Only after a high engine speed is reached is the effective pulley diameter rapidly increased to rapidly accelerate the vehicle.

The novel features of the invention are set forth with particularity in the appended claims. The invention will best be understood from the following description when read in conjunction with the accompanying drawings.

BRIEF DESCRIPTION OF THE DRAWINGS

FIG. 4 is a partial view of the transmission of FIG. 2;

FIG. 5 is an enlarged partial view of the cam of FIG. 4; and

FIG. 6 is a perspective view of a motorcycle constructed in accordance with another embodiment of the invention, in which the transmission includes an intermediate shaft between the engine shaft and rear axle.

DESCRIPTION OF THE PREFERRED EMBODIMENTS

Figure 1:
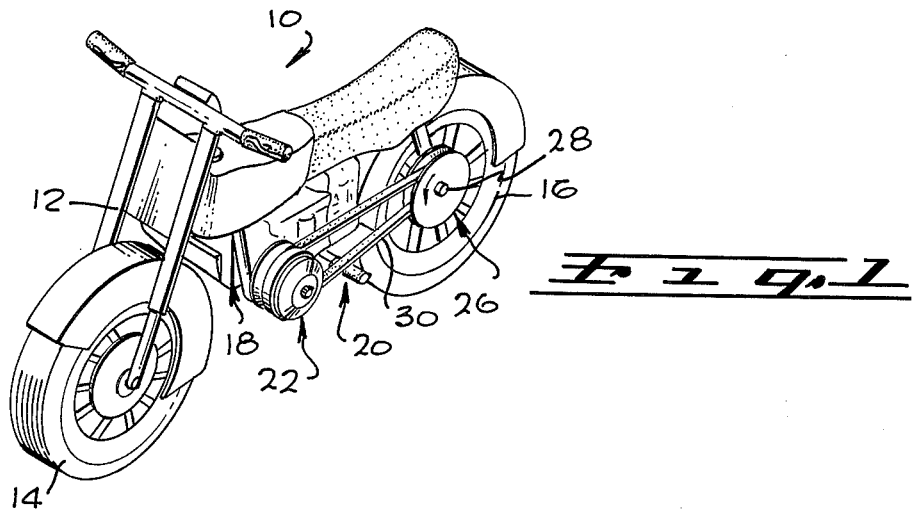
FIG. 1 is a perspective view of a motorcycle constructed in accordance with the present invention, with the transmission cover removed.
Figure 2:
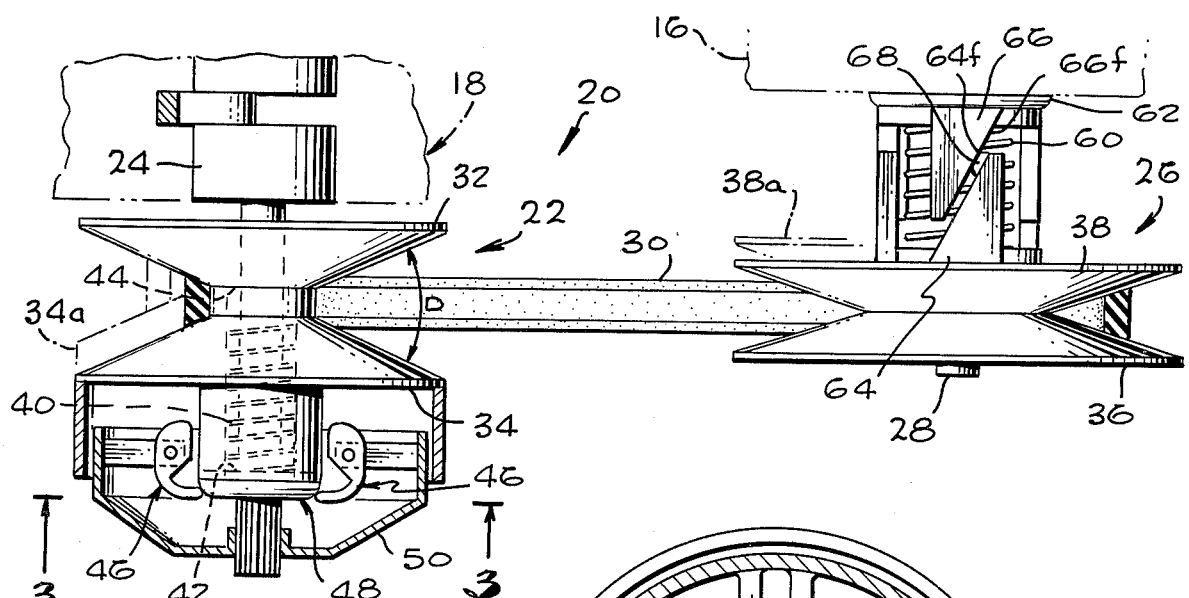
FIG. 2 is a plan view of the transmission of the motorcycle of FIG. 1.
Figure 3:
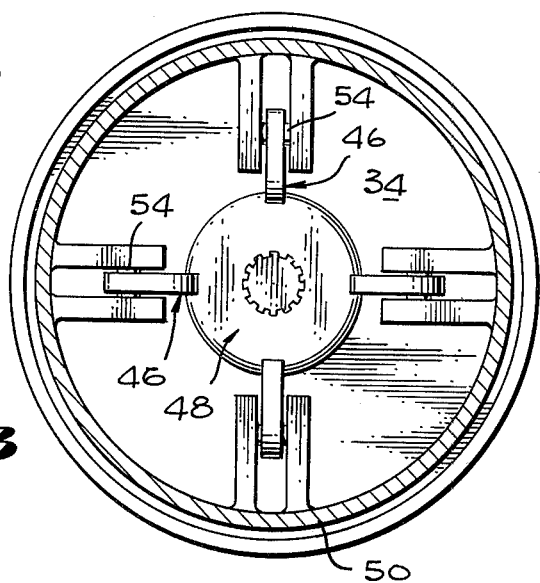
FIG. 3 is a view taken on the line 3—3 of FIG. 2.

FIG. 1 illustrates a motorcycle 10 of the invention, which includes a frame 12, front and rear wheels 14, 16 rotatably mounted on the frame, an engine 18 mounted on the frame, and a transmission 20 for connecting the crankshaft of the engine to the rear wheel. As best illustrated in FIGS. 2 and 3, the transmission includes a primary pulley assembly 22 which is mounted on the crankshaft 24 of the engine, a secondary pulley assembly 26 that is mounted on the rear axle 28 which is fixed to the rear wheel, and a belt 30 for connecting the two pulley assemblies. Each pulley assembly includes a pair of sheaves that can move together and apart to vary the effective pulley diameter and thereby change the "gear" ratio or speed ratio, that is, the ratio between the rotational speed of the output shaft or rear axle 28 to the rotational speed of the crankshaft 24.

The primary pulley assembly 22 has two sheaves 32, 34 with cone-shaped faces. Both sheaves are rotationally fixed to the crankshaft, but one sheave 34 can move axially along the shaft on splines. The moveable sheave can move between the position 34 wherein it is furthest from the other sheave 32 to the position indicated in phantom lines at 34a wherein it is closest to the fixed sheave 32. As the moveable sheave 34 moves towards the other sheave, the belt 30 engages regions of progressively greater diameter along the cone-shaped faces of the sheaves. Accordingly, as the sheaves move together, the belt 30 is driven at a higher speed and it therefore can drive the output shaft 28 at a higher speed, even for a constant crankshaft speed.

The secondary pulley assembly 26 is also constructed with a pair of sheaves 36, 38. Both sheaves rotate with the output shaft 28, but one of the sheaves 38 can move axially along the output shaft as well as turning by a small angle relative to the output shaft. When the sheaves 36, 38 are together, the belt 30 rides along sheave regions of greatest diameter, so that the output shaft 28 is driven at a low speed. When the sheave 38 moves to the position indicated at 38a, the belt 30 can ride down along the sheave faces to engage regions of progressively smaller diameter, so that the output shaft is driven at progressively higher speeds for a given belt velocity. The output shaft 28 may be the rear axle which holds the rear wheel, as illustrated in FIG. 1, or may be a jackshaft illustrated at 28a in the motorcycle 10a of FIG. 6, which is coupled through a chain 29 to a sprocket on the rear wheel.

An increase in the speed ratio of the transmission occurs when the engine or crankshaft speed increases. The moveable sheave 34 of the primary pulley assembly is urged towards its initial position by a spring 40 which surrounds the crankshaft and which has opposite ends that respectively bear against an internal wall 42 of the moveable sheave 34 and an internal wall 44 of the fixed sheave 32. The separating force of the spring can be overcome by a group of centrifugal weights 46 that bear against a cam 48. The cam 48 is fixed to the moveable sheave 34, so that axial forces on the cam 48 tend to move the moveable sheave 34 towards the fixed sheave in opposition to the spring 40. The centrifugal weights 46 are pivotably mounted on a support or cap 50 that is fixed to an end of the crankshaft. The weights are formed with large outer ends 52 on one side of the pivot locations 54, so that centrifugal force causes the weights to pivot in a direction for their inner ends or noses 56 to bear against the cam 48. The spring 40 is preloaded so that at low engine speeds the centrifugal weights cannot apply sufficient force to move the moveable sheave 34. However, at a predetermined low speed, the axial forces applied to the cam are sufficient to begin moving the cam and moveable sheave and compress the spring 40.

As the crankshaft speed increases and the moveable sheave 34 moves closer to the fixed sheave 32, the belt 30 begins to ride along regions of the sheave faces of progressively greater diameter. This increases the tension in the belt so that the region which is wrapped around the secondary pulley assembly 26 begins to move radially inwardly and begins to separate the sheaves 36, 38. The moveable sheave 38 of the secondary pulley assembly is urged against the fixed sheave 36 by a coil spring 60 that extends between a hub portion 62 of the rear wheel and the moveable sheave 38. Thus, the spring 60 urges the sheaves together, but permits separation when the belt is forced to ride closer to the axis of rotation of the rear axle.

The transmission portion at the rear wheel is also provided with a pair of load sensing cam assemblies 64, 66 that can apply axial forces that add to the force of the spring 60 to urge the sheaves 36, 38 together. One of the cam assemblies 64 is fixed to the moveable sheave 38 while the other 66 is fixed to the hub 62 of the rear wheel. A large amount of torque that is supplied from the engine to the rear wheel is applied through the cam assemblies 64, 66, so that the forces applied between the faces 64f, 66f of the cam assemblies depends upon the transmitted torque. These cam faces are angled so that the cams also apply an axial force to one another that tends to separate them. Accordingly, at progressively higher torques or loads, the moveable sheave 38 is pressed with progressively greater force towards the fixed sheave 36, to add to the axial force supplied by the spring 60. The combined axial force which resists separation of the secondary sheaves tends to keep the transmission at a low speed ratio when a high torque or load must be delivered to the rear wheel, as during rapid acceleration of the motorcycle. The cam assemblies 64, 66 transmit forces through an intermediate bearing or button 68, and are maintained pressed towards one another by the spring 60 which is mounted to apply torsional as well as axial forces. This spring has opposite ends respectively fixed to the hub 62 of the rear wheel and the moveable sheave 38, and the spring is under a high initial torsion so that it tends to maintain the cam faces 64f, 66f pressing against the intermediate button 68.

For a given output torque, the speed ratio of the transmission depends upon the speed of the motor crankshaft. The two influences on shifting of the moveable sheave 34 of the primary pulley assembly are the spring 40 that urges the primary sheaves apart and the centrifugal weights 46 that bear against the cam 48 to urge the primary sheaves together. The force applied by the spring 40 changes linearly, or in direct proportion to axial shifts of the moveable sheave 34. The force applied by the centrifugal weights 46 is nearly proportional to the square of the rotational speed of the crankshaft. The speed ratio which is attained at any particular camshaft speed is closely controlled by the shape of the cam 48.

FIGS. 4 and 5 illustrate the shape of the cam 48 and the manner in which the nose 56 of a centrifugal weight moves along the cam as the cam moves axially along the crankshaft. The nose 56 of the centrifugal weight is rounded and applies a force F perpendicular, or normal, to the region of the face against which it presses. The axial component $F_a$ of this force is the only component that urges the cam to slide axially. At low crankshaft speeds, the weight contacts a point 70 along the face of the cam, where the face angle A is a small value such as 15° so that the axial force component $F_a$ is small. The face angle gradually increases at progressively higher crankshaft speeds until it reaches a value B of 45° at a moderately high crankshaft speed when the weight bears against a point 72, and finally the angle reaches a high value C of nearly 90° at nearly maximum engine speed.

The shape of the face of the cam 48 largely determines the manner in which shifting of the transmission occurs, and this can determine whether the motorcycle can accelerate in the shortest time between zero and top speed or between any two intermediate speeds. If the cam had a constant face angle as indicated by the phantom line 76, then upshifting, or the rate of increase in speed ratio of the transmission, would occur rapidly for the transmission of FIG. 2 wherein the belt-engaging surfaces of the sheaves are formed at a constant cone angle D. This is because the axial force applied by the centrifugal weights to the cam face would rapidly increase with engine speed, in proportion to the square of the engine speed. This would be unsatisfactory because the rapid increase in torque on the crankshaft as it approached moderate apeeds would be likely to cause the engine to stall. The cam face can be modified to the configuration illustrated by phantom lines at 78 in FIG. 5, to compensate for the fact that the centrifugal weights apply a force proportional to the square of the speed of the crankshaft, the cam face 78 being a portion of a circle with a center at 80.

In accordance with the present invention, the cam 48 is formed with a steep face angle at the point 70 and along most of the height of the cam to the point 72. The face angle increases rapidly only near the top of the cam which is a region contacted by the centrifugal weights only at very high engine speeds. As a result, there is only a small axial movement of the cam even up to moderate engine speeds, so that the transmission remains at a low speed ratio until a high engine speed is reached. Only at a moderately high engine speed does the speed ratio of the transmission begin to greatly increase. By maintaining the transmission at a low speed ratio up to moderately high speeds, the transmission applies only a small load to the engine so that the engine is able to more rapidly accelerate the crankshaft up to a high speed.

At a high crankshaft speed, the engine is able to deliver a large power output, and only then is the transmission shifted up. The output torque of the engine may actually decrease at higher speeds. However, the power output greatly increases with engine speed, since the power is proportional to torque times speed. By applying only a small torque to the engine while it is accelerating the crankshaft, the transmission permits a rapid engine acceleration to a high horsepower capability. Only then does the transmission begin to greatly load the engine to accelerate the motorcycle. This manner of transmission speed changing is peculiarly useful in motorcycle type vehicles which have low traction and high horsepower-to-weight ratios, because a very rapid acceleration of the rear wheels at low speeds often causes the wheel to spin on the ground. By more slowly increasing the speed ratio at the beginning of acceleration, the initial acceleration may be slower, but the engine is allowed to build up to a high power output capability more quickly. Then at moderate motorcycle speeds the engine is able to provide a high acceleration. The speed which can be reached in a given time period which is long enough for nearly top speed to be reached, is greater than the speed which can be reached with a more uniform upshifting of the transmission. Similarly, the time required to cover a given distance from a standing start, where the distance is long enough for the motorcycle to reach almost top speed, is shorter than for a more uniform shifting of the transmission.

In the cam 48 as shown in FIG. 5, the face angle A at the initial or engagement position of the cam at 70 is approximately 15°. The axial distance between this point 70 and the top of the cam at 80 where the cam extends nearly radially, is indicated by the distance dimension $K_1$. When the centrifugal weight engages the cam at the point 72 where the face angle B is 45°, the axial distance $K_2$ to the top of the cam is very small, and in fact is less than one-half the initial distance $K_1$. Above the point 72, the face angle changes rapidly towards a 90° angle. The rapid change of face angle may also be appreciated by considering the small distance between points 82 and 84 along the curve where the face angles are respectively 30° and 60°, the axial distance $K_3$ between these points being less than one-third the total axial distance $K_1$.

Thus, the invention provides a motorcycle with a variable speed transmission of the type that has moveable pulley sheaves, wherein the speed sensing mechanism for the primary pulley assembly is constructed to provide a high motorcycle acceleration. The speed sensing mechanism includes a cam moved by centrifugal weights to compress a spring, the cam face being formed with a small initial face angle at the engagement region where spring compression first begins. Furthermore, the face angle increases slowly up to a region where the angle is 45°, and at a location thereybeyond the angle rapidly increases to nearly 90°. The effect of this cam face configuration is to maintain the transmission at a low speed ratio until the engine has attained a speed close to maximum speed, and to then rapidly increase the speed ratio. By maintaining a low engine load until the engine speed has reached a high level, the transmission allows the engine to quickly reach a high horsepower output level before converting the output to rapid rear wheel acceleration. While some sacrifice in acceleration of the rear wheel occurs at lower speeds, this sacrifice is not as great as might be supposed because the rear wheel of a motorcycle will often slip on the ground at the beginning of rapid acceleration, and the more rapid attainment of high engine horsepower capability results in more rapid acceleration at moderate to higher speeds so that a more rapid average acceleration is attained.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A motorcycle comprising:
   a motorcycle frame;
   front and rear wheels rotatably mounted on the frame;
   an engine mounted on the frame;
   first and second shafts respectively coupled to the engine and rear wheel;
   a first pulley means including first and second pulley sheaves rotatably fixed to said first shaft, said first pulley sheave axially slideable on the first shaft, said pulley sheaves having cone-shaped faces;
   a second pulley means mounted on said second shaft;
   a belt extending around said first and second pulley means to transmit power therebetween;
   a cam member fixed to the moveable pulley sheave on said first shaft;
   a second assembly including a support fixed to said first shaft and a plurality of centrifugal weights pivotally mounted on the support and having first end portions engaged with said cam member, said centrifugal weights being urged to pivot by centrifugal forces, when the support rotates, so that said end portions press against the cam member with a force that increases with rotational speed of the first shaft, said force urging said first pulley sheave towards said second pulley sheave; and
   a spring preloaded to urge said second pulley sheave away from said first pulley sheave;
   said cam member formed with predetermined engagement and top speed cam regions that sequentially engage the centrifugal weights as the moveable pulley sheave moves sequentially from an engagement position wherein the force of the centrifugal weights thereon first exceeds the preload of said spring so that the cam member and moveable pulley sheave begin to axially slide, and a top speed position wherein said pulley sheaves are closest together;
   the face angle of said cam member, as measured between the radial direction to the axis of the first shaft and imaginary lines normal to the cam face, increasing from less than 45° at said engagement position to an angle of 45° at an intermediate position, and a predetermined high angle of more than 45° at said top speed position, the axial distance $K_2$ between said intermediate position and said top speed position being less than one-half the axial distance $K_1$ between said engagement position and said top speed position;

said cam member being formed so the face angle changes from 30° to 60° along an axial distance $K_3$ which is less than one-third said axial distance $K_1$.

* * * * *